Nov. 8, 1932.    J. R. HANSON    1,887,304
TRANSMISSION
Filed June 14, 1929    5 Sheets-Sheet 2

Inventor
John R. Hanson
by Hazard and Miller
Attorneys

Nov. 8, 1932.    J. R. HANSON    1,887,304
TRANSMISSION
Filed June 14, 1929    5 Sheets-Sheet 3

Nov. 8, 1932.  J. R. HANSON  1,887,304
TRANSMISSION
Filed June 14, 1929   5 Sheets-Sheet 5

Inventor
John R. Hanson
by Hazard and Miller
Attorneys

Patented Nov. 8, 1932

1,887,304

UNITED STATES PATENT OFFICE

JOHN R. HANSON, OF LOS ANGELES, CALIFORNIA, ASSIGNOR OF ONE-FOURTH TO T. T. WORD, OF HOUSTON, TEXAS

TRANSMISSION

Application filed June 14, 1929. Serial No. 371,073.

My invention is a transmission of a mechanical gear type for transmitting rotary motion from a driving to a driven shaft, such shafts being in axial alignment.

An object of my invention is a geared transmission utilizing planetary systems of gears in which no gear shift is necessary and in which a direct drive may be had between the driving and the driven shaft to give the high speed for forward driving.

Another object of my invention is to operate the planetary systems of gears whereby through the gearing a continuous progression of changing gear ratio may be obtained so that the driven shaft initially may be driven at a very slow speed and this speed gradually increased with substantially imperceptible changes until the maximum speed through the planetary system is obtained. Then at this high speed a shift may be made to direct drive from the driving to the driven shaft.

Another object of my invention is combining a reverse direct drive with the planetary gear system so that gradual changing reverse speeds may be obtained starting with a low reverse speed and working with gradual changes to a high reverse speed. In such high reverse speed manifestly, there can be no direct drive between the driving and driven shaft as it is presumed that the driving shaft is always rotating in the same direction.

Another object of my invention is utilizing a differential type of gear in connection with a plurality of planetary gear systems, which planetary gear systems operate in series and in which the differential gear may be utilized for reverse drive through a brake applied to prevent bodily rotation of the pinion gears to give such reverse action, or a clutch may be shifted bringing the driven gear into direct engagement with large gears of the differential system so that the differential as a whole rotates the driven shaft.

A still further object of my invention is in controlling the rate of movement and the stopping of one of the elements of each of the planetary gears by a positively driven mechanism which may be driven or stopped to control the action of one of the variable speed elements of each of the planetary gear systems.

A more detailed object of my invention in this connection is constructing the mountings for the pinion gears of each of the planetary gear systems so that such gears may be bodily rotated at the same speed as the inner main gear and the ring with which they mesh, by an external drive. In this construction the external drive may be regulated to stop the bodily rotation of the pinion gears or to rotate these at any one of the intermediate speeds between the stopping and the full speed of the driven shaft. I effect this by having a worm wheel connected for driving at the same speed as the mountings or carriers for each of the sets of pinion gears; these sets being mounted between inner main gears and ring gears external thereto. The worm wheels are each geared to a worm which worms may be positively driven so that the worm wheels may be held stationary and therefore the pinions of each system may be held stationary or the worm wheels or gears may be driven at the same speed as the driving shaft and thus function to facilitate the bodily rotation of the pinion gears of each planetary system at the same rate with which such system as a whole revolves.

Another object of my invention is controlling the rate of speed of the rotation of the worms which drive the worm wheels or gears and this is preferably done through a friction system of driving; the source of power being the driving shaft and in which the frictional drive to the worms may be such that these worms may be held stationary or driven at sufficiently high speed to rotate the worm wheels at the same speed as the driving shaft. In this connection I preferably use a friction wheel directly connected to the driving shaft and operating through a friction connection, a plurality of friction wheels having a friction element on their side face. These friction wheels by the peripheral surface drive rotate friction disks. These disks are shiftable so that they may be centered on the friction wheels and thus hold either one of the worms stationary and allow either one of the planetary gear systems to operate through the gearing. All of these friction disks may be slid outwardly on the face of the friction wheels so that the drives of the worms are at sufficiently high speed to rotate the worms as fast as the driving shaft may be driven by an engine or the like and thereby a direct high speed drive may be obtained through the planetary gear system or through the clutch connecting the driving and driven shaft.

Another feature of my invention in this connection is that the friction disks connected to one of the planetary systems may be driven in a reverse direction which is necessary for some of the speeds of drive between driving and driven gears.

My invention is more particularly described in the drawings, in which.

In the drawings I utilize a transmission casing having a body portion 11 with a forward end plate 12 and a rear end plate 13. A driving shaft 14 is illustrated as having a universal joint element 15 or some suitable means for connecting to a source of power such as a crank shaft of an internal combustion engine. The shaft is mounted in anti-friction bearings 16 located in the front plate 15.

Internal anti-friction bearings 17 are mounted on a pedestal 18 forming a part of the transmission case. The main shaft 14 has the main gear 19 of a planetary gear system directly keyed thereto and the pinions 20 meshing with external teeth on this gear are mounted in a pinion gear carrier 21 which is split as indicated at 22 to allow assembly. These pinion gears are shown as each mounted on a short shaft 23 having anti-friction bearings 24. This pinion gear carrier 21 has a front hub 25 which has anti-friction bearings 26 on the shaft 14. It also has a rear hub 27 mounted on anti-friction bearings 28 on the main shaft 14. Directly coupled to the hub 27 there is a second large gear 29 of a planetary system, the attachment being illustrated as by bolts 30.

The large gear 29 meshes with pinions 31 which are journaled in a second gear carrier 32, this carrier being split as shown at 33 to allow assembly. The carrier has an end disk 34 with an opening therethrough for the shaft 14 and has an inwardly extending flange 35 on the opposite side connecting to a hub 36. This hub has an anti-friction bearing mounting 37 on the hub 27 of the gear carrier 21. An outwardly extending flange 38 from the hub 36 carries the outer gear 39 which has internal teeth of the first planetary system. Extending inwardly from such gear at the forward end there is a disk 40 which has a hub 41 mounted on anti-friction bearings 42 which are journaled on the hub 25 of the pinion carrier 21.

The outer gear of the second planetary system employs a ring gear 43 having internal teeth at one side of which there is connected a narrow ring 44 to hold such gear in proper position and on the other side there is an inwardly extending disk 45 which has a flange 46 having an anti-friction bearing 47 engaging the inner end of the shaft 14. Integral with the disk 45 there is a hub 48 which is journaled in anti-friction bearings 49 on the large central journal 50 which latter is supported on a pedestal 51 formed integral with the transmission case.

The differential assembly designated generally by the numeral 52 employs a gear 53 which is connected to the hub 48 by bolts 54 and has anti-friction bearings 55 operating on the tubular driven shaft 56. A spider 57 indicated as somewhat triangular, (note Fig. 6) has an anti-friction bearing 58 forming a mounting on the driven shaft 56. This spider carries a drum 59 which has a series of stub shafts 60 between the drum and the spider and on which are mounted the differential pinions 61. The drum 59 has a brake thereon formed by the brake band 62 which has a friction lining 63 of the usual type. The second gear 64 of the differential is connected by a key or the like to the driven shaft 56, the pinion 61 meshing with the transmission gears 53 and 64.

The resistance or braking mechanism for the main planetary system utilizes a first worm wheel 65 which is rigidly connected to the hub 25 of the pinion carrier 21 of the first planetary system and this worm gear meshes with a worm 66 mounted on a vertical worm shaft 67 mounted in journals 68 on a bracket 69 extending inwardly from one side of the transmission case. The upper end of the shaft 67 is mounted in a journal 70 on the cover plate 71 of the transmission.

A second worm gear 72 is directly connected to the hub 41 which has a rigid connection to the pinion gear carrier 32 of the second planetary gear system, this connection being through the disk 40, the gear 39, the flange 38, the hub 36, the flange 35 and thus to the pinion carrier 32. A worm 73 meshes with the worm wheel 72, the worm being mounted on a worm shaft 74 mounted in journals 75 on a bracket 76 extending inwardly from the side of the transmission case opposite the bracket 69. This shaft 74 has a top bearing 77 in the cover 71.

The friction connection to the worms and worm gears utilizes a large friction wheel 78 which is directly keyed to the shaft 14 between the bearings 16 and 17 and this has a friction periphery 79 gearing with friction pinions 80 each being mounted on a stub shaft 82 journaled in brackets 83 extending inwardly from the upper sides of the transmission case and on opposite sides thereof. Each of these stub shafts carries a friction wheel 84 which is pressed outwardly by a spring 85. The face of the wheels 84 engage slidable friction disks 86 which are slidably mounted on the worm shafts 67 and 74 respectively; these having a featherway to allow sliding.

Figure 2:
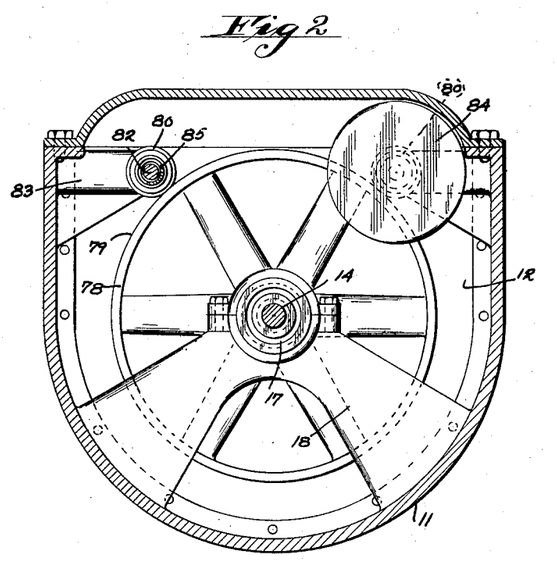
Fig. 2 is a vertical transverse section on the line 2—2 of Fig. 1 in the direction of the arrows, showing the friction connection.
Figure 3:
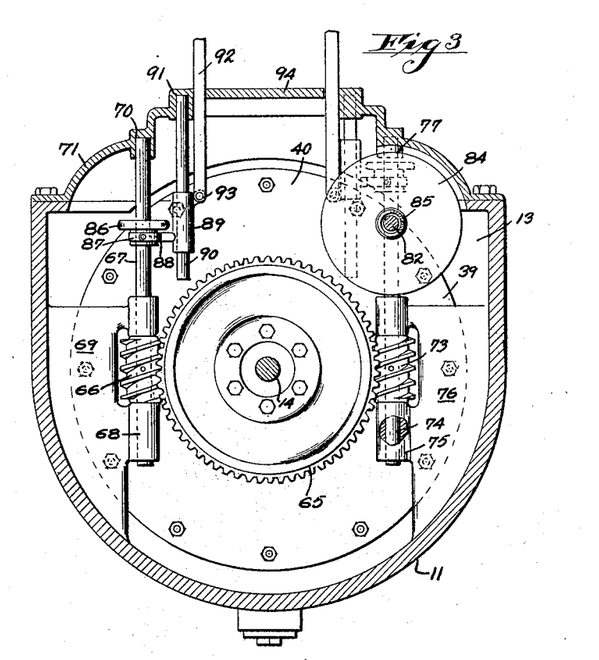
Fig. 3 is a transverse section on the line 3—3 of Fig. 1 in the direction of the arrows, showing the worm and worm wheel resistance.
Figure 4:
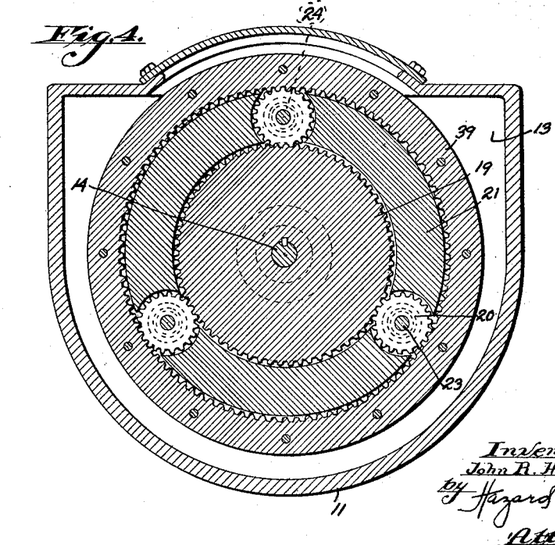
Fig. 4 is a transverse view on the line 4—4 of Fig. 1 in the direction of the arrows, being a section of the main planetary gears.

These friction disks 86 are each mounted in a collar 87 which is connected by a yoke 88 to a sliding sleeve 89, each of these sleeves being slidable on a guide rod 90 depending from sockets 91 in the cover 71 of the transmission. (Note Figs. 1, 2 and 3.) These sleeves 89 are each connected to slide rods 92 to which they are connected by pins 93. These rods slide through holes in the top portion 94 of the cover 71 and are to be understood as being connected for simultaneous operation by means not shown.

Figure 1:
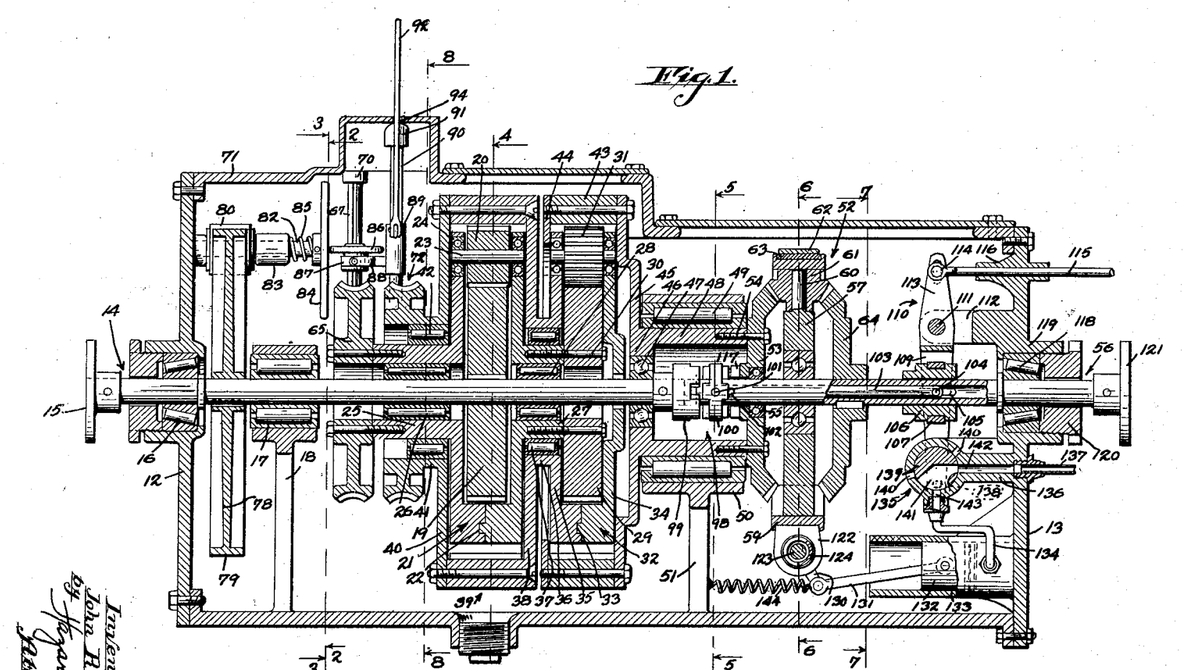
Figure 1 is a vertical longitudinal section through the transmission.
Figure 5:
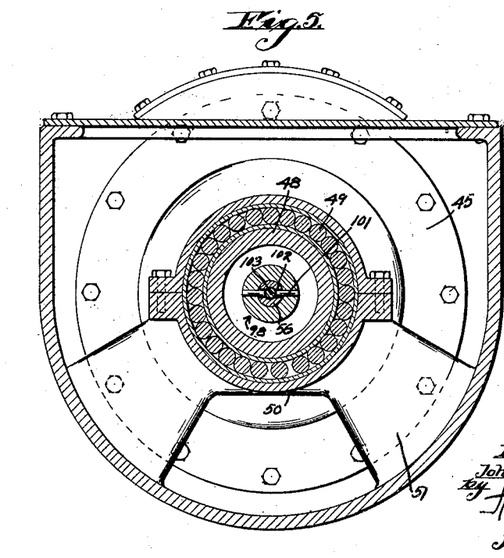
Fig. 5 is a transverse view on the line 5—5 of Fig. 1 in the direction of the arrows, through the direct connection clutch and the center bearing.

The direct drive comprises a main clutch 98 (note Figs. 1 and 5). This clutch has a jaw clutch element 99 which is rigidly secured to the inner end of the drive shaft 14 and is adapted to engage a sliding clutch element 100 which is mounted on a transverse pin 101 which extends outwardly through diametrically opposite slots 102 in the inner end of the tubular driven shaft 56. This pin is connected to the inner end of a clutch operating rod 103 which is positioned centrally in the driven shaft 56. A pin 104 is connected to the rod 103 and operates in a slot 105 in the tubular shaft 56.

The outer ends of this pin are mounted in a sliding and rotatable sleeve 106 which slides on the outside of the shaft 56 and rotates therewith. The sleeve 106 has a collar 107 mounted therein, this latter having projecting pins 108 (note Figs. 1 and 7). The outer ends of these pins are connected to the legs 109 of a yoke lever assembly 110, which lever is mounted on a fulcrum 111 in brackets 112 extending inwardly from the end 13 of the transmission case. The upper end 113 of the yoke lever has a pin and slot connection 114 to a slide rod 115 which slides through a guide 116 in the end plate 13 of the transmission case.

The gear 53 of the differential has clutch jaws 117 which are adapted to engage with the clutch jaws on the sliding unit 100. Therefore this latter unit may engage either the jaws of the clutch element 99 on the drive shaft 14 and give a direct drive to the driven shaft 56. This direct drive is obtained when the rod 115 is pulled rearwardly thus thrusting the pin 104 and the rod 103 forwardly. When the clutch element 100 is between the clutch jaws 99 and 117 it is in the neutral position as shown in Fig. 1. Hence there is no direct drive to the shaft 56. However, when the rod 103 is pulled rearwardly by thrusting the rod 115 inwardly, the sliding clutch element 100 engages the clutch jaws 117 on the differential gear 53 and makes a direct connection from such gear to the driven shaft 56. This gear as above described is rigidly connected to drive with the internal ring gear 43 of the second planetary system through the connection by the disk 45 and the hub 48.

The rear end of the driven shaft 56 is mounted in anti-friction bearings 118 mounted in the journal 119 in the end plate 13 of the transmission case; this bearing being held in place by a nut 120 and the shaft is illustrated as having a joint element 121 suitable for connection to a universal joint or the like from which the propeller shaft of an automobile may be driven.

Figure 6:
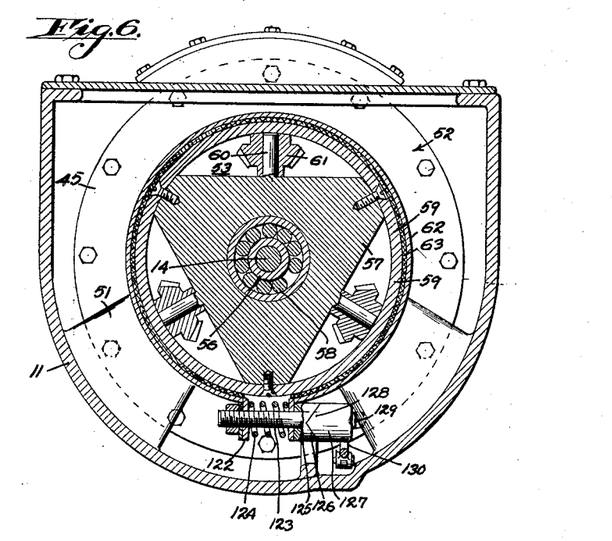
Fig. 6 is a transverse section on the line 6—6 of Fig. 1 in the direction of the arrows, through the differential.
Figure 7:
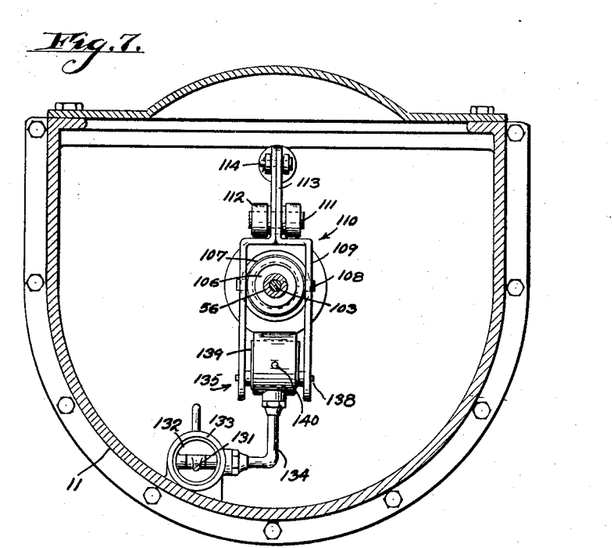
Fig. 7 is a transverse section on the line 7—7 of Fig. 1 in the direction of the arrows, showing the main clutch operating lever and the valve controlling the differential action.
Figure 8:
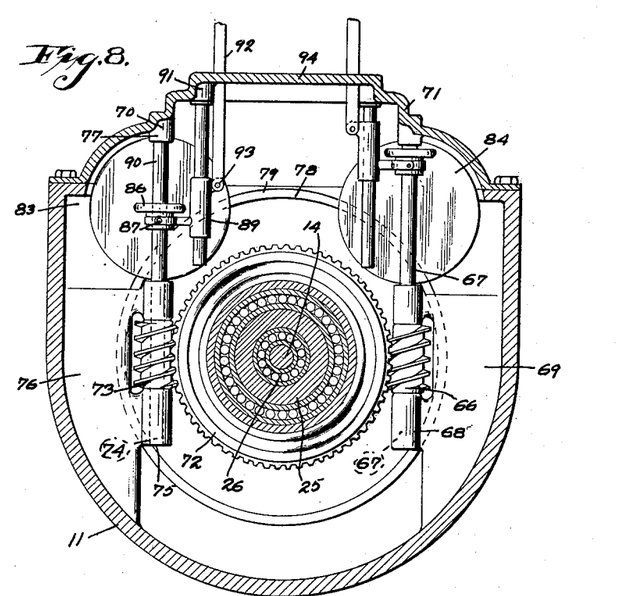
Fig. 8 is a transverse section on the line 8—8 of Fig. 1 in the direction of the arrows.
Figure 9:
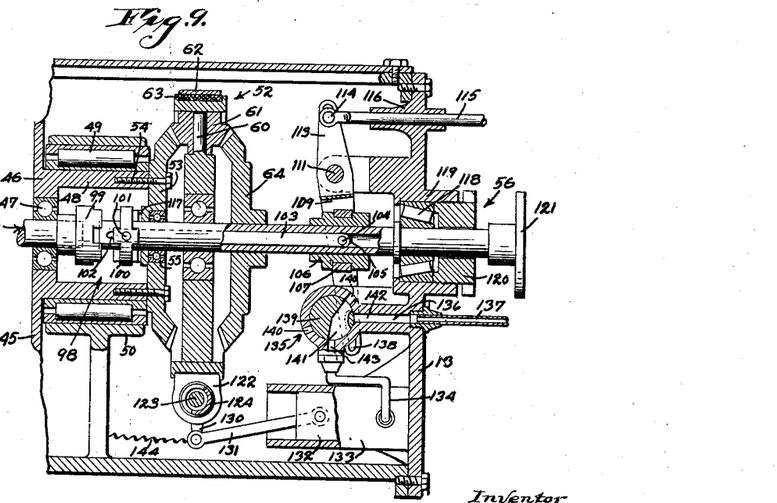
Fig. 9 is a partial view similar to Fig. 1, showing the main clutch in a different position.

The manner of controlling the differential through the brake band 62 is substantially as follows, referring particularly to Figs. 1, 6 and 7: The brake band has a pair of ears 122 with a bolt 123 extending therethrough and having a spring 124 normally thrusting these ears apart and holding the lining of the brake band loose on the differential drum 59. The bolt has a head 125 with a V-shaped notch 126 and in this notch there fits a rocker hub 127 having a V-shaped end 128. This hub is retained in position by the nut 129 on the end of the bolt 123. There is a crank arm 130 connected to the hub 127 and this is attached to a connecting rod 131 of the piston 132 sliding in the cylinder 133, such cylinder being illustrated as being attached to the end plate 13 of the transmission casing.

The piston is illustrated as operated by a vacuum there being a pipe 134 connecting the cylinder to a valve assembly 135. This assembly is mounted on a bracket 136 extending inwardly from the end plate 13 and having a pipe 137 leading to a source of vacuum such as the intake of an internal combustion engine. The lower end of the legs 109 of the yoke assembly 110 are connected to pins 138 which are adapted to rock the barrel 139 of the valve.

In the neutral position shown in Fig. 1 there is a connection to the source of vacuum and the piston 32 is drawn inwardly, thus applying the brakes. When the yoke lever 110 is rocked, either to one direction or the other, for making the direct drive from the drive shaft 14 to the driven shaft 56, or by making the connection from the differential gear 53 to the shaft 56 through the clutch elements 100 and 117, the barrel 139 is rocked so that there is a connection 140 to atmosphere. The barrel 139 of the valve is provided with an enlarged duct 141 which connects to the port 142 leading to the pipe 137 and to the port 143 leading to the pipe 134 and hence to the cylinder. This in the position shown in Fig. 1 makes a connection to the source of vacuum and when the barrel is rocked it cuts off the connection to the port 142 and makes a connection between the duct 141 and either of the ports 140 and the port 143; thus making a connection to atmosphere and allowing the return of the piston in the cylinder to its normal position, which piston is retracted by a retraction spring 144.

As above mentioned when the main clutch 98 is in the neutral position the pinions of the differential are held by the brake drum of the differential, being secured by the brake band and thus the power is transmitted through the rotating pinions of the differential.

The manner of operation and control of my transmission is substantially as follows: The worms 66 and 73 which mesh with the worm gears 65 and 72 are not required to communicate any driving force to these worm gears as such worm gears are rotated through the medium of the planetary transmissions and therefore it is only necessary for the worms to rotate at a sufficiently high speed to allow the free rotation of the worm wheels when it is necessary to have free rotation of the whole planetary systems or part thereof and that by retarding and finally stopping either one or other of the worms and their worm gears, different functions may be developed in the planetary transmission in the development of power and changing speeds of rotation. The different speeds for rotating the worms is derived through the friction disks 86 being brought into different positions with the friction wheels 84. The high speed is when the disks engage the periphery of the wheels. To move the disks from the periphery into the center brings the worms and hence the worm wheel with which a worm meshes, to rest. Shifting the friction disks 86 beyond the center gives them a different direction of rotation and hence rotates the worm and worm gears in a reverse direction.

I have not indicated any particular apparatus for shifting the control rods 92 which control the position of the friction disks on the friction wheels as such does not form an immediate part of this invention. I contemplate the provision of an operating means whereby the said disks will be retained in a definite relation to each other so that when one is moved the other is also moved relative thereto, or in which when one is stationary the other must be free to move. Neither have I shown a connection for operating the slide rod 115 controlling the main clutch 98 and the application of the brakes to the differential mechanism, as this does not form an immediate part of this invention.

It is presumed that it is desired to gradually work the speed of the driven shaft 56 from rest to a full speed in the forward direction, the driving shaft 14 being operated a fairly high speed. When the main clutch 98 is in the neutral position as shown in Fig. 1, the friction disk 86 may be adjusted to engage the periphery of the friction wheels 84 in which case both worms are driven at their maximum speed and the planetary gear systems will idle without any transmission of power to the driven shaft 56. Hence with my transmission it is not necessary to use a clutch to connect and disconnect the engine from the transmission. To gradually bring the speed of the shaft 56 from zero to high speed, the friction wheel in controlling the worm operating the worm wheel 72 is gradually shifted from the periphery of its disk 84 to the center and when at the center stops the rotation of the worm wheel 72. This in its turn prevents the rotation of the ring gear 39 of the first transmission system and this also brings to rest the pinion gear of the second planetary system and the shaft 56 is thus driven at a low fixed speed ratio compared with the speed of rotation of the drive shaft 14 and in a forward direction, that is, the same direction of rotation, the transmission being through the differential.

The next gradual step in speed may be made to a high speed through the planetary system and to do this the friction disk controlling the worm 65 is gradually moved from the periphery of its friction wheel 84 towards the center and the friction disk 86 controlling the worm wheel 72 is shifted on its friction wheel 84 beyond the center to give such worm and worm wheel 72 a reverse rotation. This gradually increases the speed and when the worm gear 65 is brought to rest and the worm wheel 72 driven in a reverse direction at high speed, a high speed is obtained in the driven shaft 56 in a forward direction. The stoppage of the worm gear 65 holds the pinions of the first planetary system stationary and also holds the spur gear 29 of the second planetary system stationary.

When the transmission is operating at high speed, the main clutch 98 may be shifted to give a direct connection through the clutch elements 100 and 99 between the driving shaft 14 and the driven shaft 56 as the high speed through the planetary system of transmission is substantially the same as the speed of rotation of the shaft 14 and thus the connection of the clutch at the high speed of rotation may be obtained without any trouble or clashing of gears. A shift may also be made from the direct connection to the connection at high speed through the transmission in an easy manner. When this shift of the main clutch 98 to a direct drive is made, the friction disks 86 will each be shifted on its friction wheel 84 to drive their respective worm wheels in a forward direction at high speed, because these worm wheels should then rotate at the same speed as the driving shaft 14. It is manifest that at any speed of transmission of power that the speed of the driving shaft 14 may be changed.

To obtain a reverse drive, that is to drive the driven shaft 56 in a reverse direction from the drive shaft 14, the rod 115 is operated so as to operate the clutch 98, shifting the clutch element 100 to disengage the clutch box 117 on the differential gear 53. This rod 115 also controls the main clutch for the direct drive; the low speed of rotation in a reverse direction is then obtained in the manner above described for the direct drive, that is, the worm wheel 72 is first brought to rest while the worm wheel 65 is driving in a forward direction, which gives the low speed of fixed ratio between the driving and driven shaft. The speed in reverse direction may be increased by bringing the worm gear 65 to rest while the worm 72 is driven in a reverse direction and this may be a gradual change as above described by shifting of the friction disks on their respective friction wheels. The drive in the reverse direction rotates the differential as a whole but manifestly it is not possible in the reverse direction to have a direct drive between the driving and driven shafts.

From the above description it will be seen that it is not necessary to have a main clutch which needs to be opened every time a change of gear ratio is to be made and also that gradual changes may be made in the speed of the driven shaft from rest until a fixed low ratio is obtained and then speed may be gradually increased until a fixed high gear ratio is obtained through the planetary systems and this being done by the operation of shifting the friction disks into different positions in engagement with their respective friction wheels. Such disks and wheels are only required to aid the rotative force of the worms 66 and 73, for as above mentioned the worm wheels 65 and 72 are under rotated stresses from their respective planetary systems tending to rotate the same. The slip of the friction drives compensates for any slight difference there may be in the speed between the worms and the worm wheels derived from the planetary system and then through the friction system.

Another feature of my invention is that when a high speed in a forward direction has been obtained through the planetary gear transmission, that a shift may be readily made to direct shaft drive at substantially the said high speed, which speeds being practically the same, allow an easy shift in the operation of the main clutch 98.

It will thus be seen that by the simple operation of the two slide rods 92 and the slide rod 115 that the various graduations of speed may be obtained in either a forward or reverse drive and that the direct drive may be had in a forward direction. In these changes an engine clutch may be eliminated.

A feature of my invention is that when the main clutch is in the neutral position that the friction gears driving the worms may be adjusted to allow free rotation of the planetary gear systems without transmitting power to the driven shaft and thus eliminate the use of a clutch connecting to the driven shaft. Also when the main clutch is connected to the driven shaft, the friction disks may drive the worms at the proper speed to transmit no power through the planetary transmissions and hence allow the driving shaft to idle without transmitting power to the driven shaft.

One of the purposes of having two distinct planetary transmission systems is to vary the torque of the driven shaft in comparison with that of the driving shaft and at the fixed low speed through the planetary transmission, a torque is obtained at the driven shaft which is increased in proportion to the gear ratio between the driving and the driven shaft.

Various changes may be made in the principles of my invention without departing from the spirit thereof as set forth in the description, drawings and claims.

I claim:

1. In a transmission, a drive shaft, a driven shaft, driving connections between said shafts including a plurality of transmission systems of the planetary type, each having as elements a spur gear, a series of pinion gears and a ring gear, interconnected means to control the rotation of a plurality of elements of a plurality of said planetary systems, whereby the driven shaft may be rotated at a predetermined low speed and again at a predetermined high speed, said means being adapted to allow graduated speed between rest and the low speed and between the low speed and the high speed.

2. In a transmission, a driving and a driven shaft, a pair of transmission systems, each having as elements a spur gear, a set of pinion gears and a ring gear, one of said elements of one of the systems being connected to the driving shaft, means to connect one of the elements of the second system to the driven shaft, means to simultaneously control a pair of elements of each of the systems, whereby the speed of the driven shaft may be varied from rest to a predetermined minimum and means to control another pair of elements of both of the systems to vary the speed of the driven shaft from low to high speed.

3. In a transmission, a driving shaft, a driven shaft, a pair of transmission systems, each having as elements a spur gear, a set of pinion gears and a ring gear, the spur gear of the first system being connected to the driving shaft and the ring gear of the second system being connected to operate the driven shaft, a first means to control the ring gear of the first system and the pinions of the second system, and a second means operatively connected with said first means to control the pinions of the first system and the spur gear of the second system, whereby the speed of the driven shaft may be varied from rest to a predetermined minimum and from such minimum to a predetermined maximum.

4. In a transmission as claimed in claim 3, a differential mechanism operatively connected to the ring gear of the second system and to the driven shaft, means to convey the drive through the planetary system, through the differential for one direction of rotation of the driven shaft and through the ring gear of the second system and direct to the driven shaft for a different direction of rotation of the driven shaft.

5. In a transmission, a driving and a driven shaft operative connections between said shafts including, a pair of planetary transmission systems, each having as elements a spur gear, a plurality of pinion gears and a ring gear, the pinion gears of the first system being connected to the spur gear of the second system to operate together and the ring gear of the first system being connected to the pinion gears of the second system to operate together, and means to control the connected elements of each of the systems to transmit a speed of rotation from rest to a predetermined maximum to the driven shaft, and a direct connection device for connecting the driving and driven shaft adapted for connection when the driven shaft has the predetermined high speed.

6. In a transmission, a driving shaft and a driven shaft, a pair of transmission systems, each having as elements a spur gear, a set of pinion gears and a ring gear, the spur gear of the first system being connected to the driving shaft, a differential gearing device, the ring gear of the second system being connected to one side of the differential device, a direct coupling for the pinion gears of the first system and the spur gear of the second system, and the ring gear of the first system and the pinions of the second system, means to control the rotation of such coupled units, whereby the driven shaft may be driven from the rest to a predetermined low speed and in a continuous progression to a predetermined high speed, the said differential device having means to drive the driven shaft therethrough or to rotate the differential as a whole with the driven shaft.

7. In a transmission as claimed in claim 6, the means to drive the differential as a whole with the driven shaft including a clutch element connected to one part of the differential, and a second slidable clutch element to engage therewith and a direct drive connection between the driving to form driven shafts.

8. In a transmission, a driving and a driven shaft, operative connections between said shafts including a pair of planetary transmission systems, each having a spur gear, a plurality of pinions and a ring gear forming elements, means to interconnect two of the different elements of each of the systems to operate together and means to control each of the connected elements to vary the speed of the driven shaft from rest to a predetermined high speed through a predetermined low speed, one of the elements of the second system being connected to a differential device, one part of said device being connected to the driven shaft, means to operate said differential to convey the drive therethrough or to cause such differential device as a whole to rotate with the driven shaft.

9. In a transmission, a driving and a driven shaft, a transmission system having a plurality of planetary units, one of said units of the system being connected to the driving and another of the units of the system to the driven shaft, a driven gear connected to one of the units to rotate at the same speed therewith, a driving gear to operate with said driven gear and a friction drive to operate the driving gear, whereby a varying resistance may be had to the rotation of the element of the planetary system connected to the driven gear to obtain a variation in the speed of the driven relative to the driving shaft.

10. In a transmission, a driving and a driven shaft, a system of a plurality of planetary transmissions, each having a plurality of gears as driving elements, a control element connected to one of said elements to rotate at the same speed therewith relative to the driving shaft, and means to vary the speed of the control element whereby a resistance may be made to the driving element to which the control element is connected and to stop such control element thereby varying the speed of rotation of the driven shaft in reference to the driving shaft.

11. In a transmission system, a driving shaft, a driven shaft, a plurality of planetary transmission units connecting said driving and driven shafts, separate but interconnected means simultaneously operable to vary the speed of rotation of either of said transmission units, independently of the other, one of said transmission units being connected with said driven shaft whereby a variable speed from rest to a maximum high may be communicated to said driven shaft.

12. In a transmission system, a driving shaft, a driven shaft, a plurality of planetary transmission units connecting said driving and driven shafts, separate but interconnected means simultaneously operable to vary the speed of rotation of either of said transmission units, independently of the other, one of said transmission units being connected with said driven shaft whereby a variable speed from rest to a maximum high may be communicated to said driven shaft and a differential in the transmission system whereby the direction of rotation of said driven shaft may be reversed.

13. In a transmission, a driving shaft, a driven shaft, a pair of transmission systems, each having as elements a spur gear, a set of pinion gears and a ring gear, the spur gear of the first system being connected to the driving shaft and the ring gear of the second system being connected to operate the driven shaft and separate means to control the two systems, including manually adjustable gears associated with each system and connected to operate in a definite relationship whereby the speed of the driven shaft may be varied from rest to a predetermined minimum and from said minimum to a predetermined maximum.

In testimony whereof I have signed my name to this specification.

JOHN R. HANSON.